(12) United States Patent
Gandrud

(10) Patent No.: US 7,038,339 B2
(45) Date of Patent: May 2, 2006

(54) METHOD AND MEANS OF SEALING AN ELECTRICAL CONDUCTOR THROUGH THE HOUSING OF A FLUID FILLED MOTOR

(75) Inventor: Michael D. Gandrud, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 70 days.

(21) Appl. No.: 10/815,250

(22) Filed: Mar. 31, 2004

(65) Prior Publication Data
US 2005/0218733 A1   Oct. 6, 2005

(51) Int. Cl.
H02K 5/10 (2006.01)
(52) U.S. Cl. ............................. 310/85; 310/71; 439/559
(58) Field of Classification Search .................. 310/71, 310/85, 68 D, 68 R; 439/559, 569
See application file for complete search history.

(56) References Cited

U.S. PATENT DOCUMENTS

| 2,516,916 | A | * | 8/1950 | Richards et al. ............. 136/256 |
| 3,850,501 | A | | 11/1974 | Butterfield et al. |
| 3,992,075 | A | | 11/1976 | Cannarsa |
| 4,241,152 | A | * | 12/1980 | Klink .......................... 429/181 |
| 4,614,397 | A | | 9/1986 | Flanigan |
| 4,822,473 | A | | 4/1989 | Arnesen |
| 5,006,741 | A | * | 4/1991 | Schott ....................... 310/68 D |
| 5,538,396 | A | | 7/1996 | Meierhoefer |
| 5,722,844 | A | | 3/1998 | Schraeder |
| 6,657,336 | B1 | | 12/2003 | Morikaku et al. |
| 2003/0102734 | A1 | | 6/2003 | Asao |

FOREIGN PATENT DOCUMENTS

| JP | 359185134 A | 10/1984 |
| JP | 401281686 A | 11/1989 |

* cited by examiner

Primary Examiner—Darren Schuberg
Assistant Examiner—Nguyen Hanh

(57) ABSTRACT

An electrical conductor is provided for a fluid filled motor having a housing. The electrical conductor comprises insulating elements received by a passage extending through the housing, and a terminal bolt passing through the insulating elements. The electrical conductor further comprises sealing means between the terminal bolt, insulating elements, and the housing, and a fastening nut secured to the terminal bolt compressing the sealing means to seal against fluid flow through the passage. A method of sealing said electrical conductor through the housing of a fluid filled motor also is provided.

10 Claims, 5 Drawing Sheets

US 7,038,339 B2

METHOD AND MEANS OF SEALING AN ELECTRICAL CONDUCTOR THROUGH THE HOUSING OF A FLUID FILLED MOTOR

BACKGROUND OF THE INVENTION

The present invention relates to electrical conductors and, more specifically, to electrical conductors for fluid filled power units.

Power units are used in many types of mobile machinery. Hydraulic machines such as hydraulic pumps and hydraulic motors are typical examples of power units. Electrical machines such as electrical motors, generators, and alternators are also commonly used power units. Power units such as electrical motors are commonly used to power mobile machinery and are oftentimes flooded or cooled with hydraulic fluid or other fluids. In some instances, these electrical motors are completely submerged in the fluid for improved cooling and thereby allow more power to be produced by a motor of a specific size while preventing damage to the motor from such increased power levels. Because of this, the components of electrical motors are enclosed in a leakproof housing. As such, it is necessary to provide a means for connecting the electrical wires that provide power to the motor through the housing while sealing against leakage of the hydraulic or other fluid through this connection. Further, as the housing typically is made of metal or other conductive materials, it is necessary to insulate the electrical connections from the housing. The same need applies not only to electrical motors but to all electrical machines used in mobile machinery, as well as, to hydraulic machines such as hydraulic pumps and hydraulic motors.

U.S. Pat. No. 3,850,501 to Butterfield et al. discloses a feedthrough electrical terminal for use in a liquid cooled shaft. Butterfield et al. accomplishes a leakproof and insulated connection through the use of non-metallic bushings and washers compressed by a threaded female terminal member. The disadvantage Butterfield et al. is that such a design requires numerous components, many of which are non-standard and must be custom machined.

U.S. Pat. No. 4,822,473 to Arnesen and U.S. Pat. No. 6,657,336 to Morikaku et al. both disclose electrical connectors that are comprised of standard pieces of hardware. Specifically, both of these patents disclose the use of standard terminal bolts as conductors. Morikaku et al. also discloses the use of insulating elements to protect the terminal bolt conductor from the metallic housing. The disadvantage of both of these designs is that they are both susceptible to leakage. As such, Arnesen and Morikaku et al. would not be useful in the specific application of a fluid filled power unit.

U.S. Pat. No. 4,614,397 to Flanigan discloses a terminal plate assembly that teaches the use of a terminal bolt as a conductor. Further, Flanigan teaches the use of terminal blocks that serve to both insulate and seal the bolt. The disadvantage of the Flanigan assembly is that it requires the use of intricately machined terminal blocks to accomplish a leakproof seal.

It is therefore a principal object of this invention to provide an electrical conductor for passing through the housing of a fluid filled power unit that is insulated from the housing and utilizes a minimal number of parts.

A further object of this invention is to provide sealing means to prevent leakage from the fluid filled power unit through the electrical conductor.

These and other objects will be apparent to those skilled in the art.

BRIEF SUMMARY OF THE INVENTION

The present invention is directed towards an electrical conductor for a fluid filled power unit having a housing. The electrical conductor comprises insulating elements received by a passage extending through the housing, and a terminal bolt passing through the insulating elements. The electrical conductor further comprises sealing means between the terminal bolt, insulating elements, and the housing, and a fastening nut secured to the terminal bolt compressing the sealing means to seal against fluid flow through the passage.

The present invention also is directed towards a method of sealing said electrical conductor through the housing of a fluid filled power unit.

DESCRIPTION OF THE INVENTION

Figure 1:
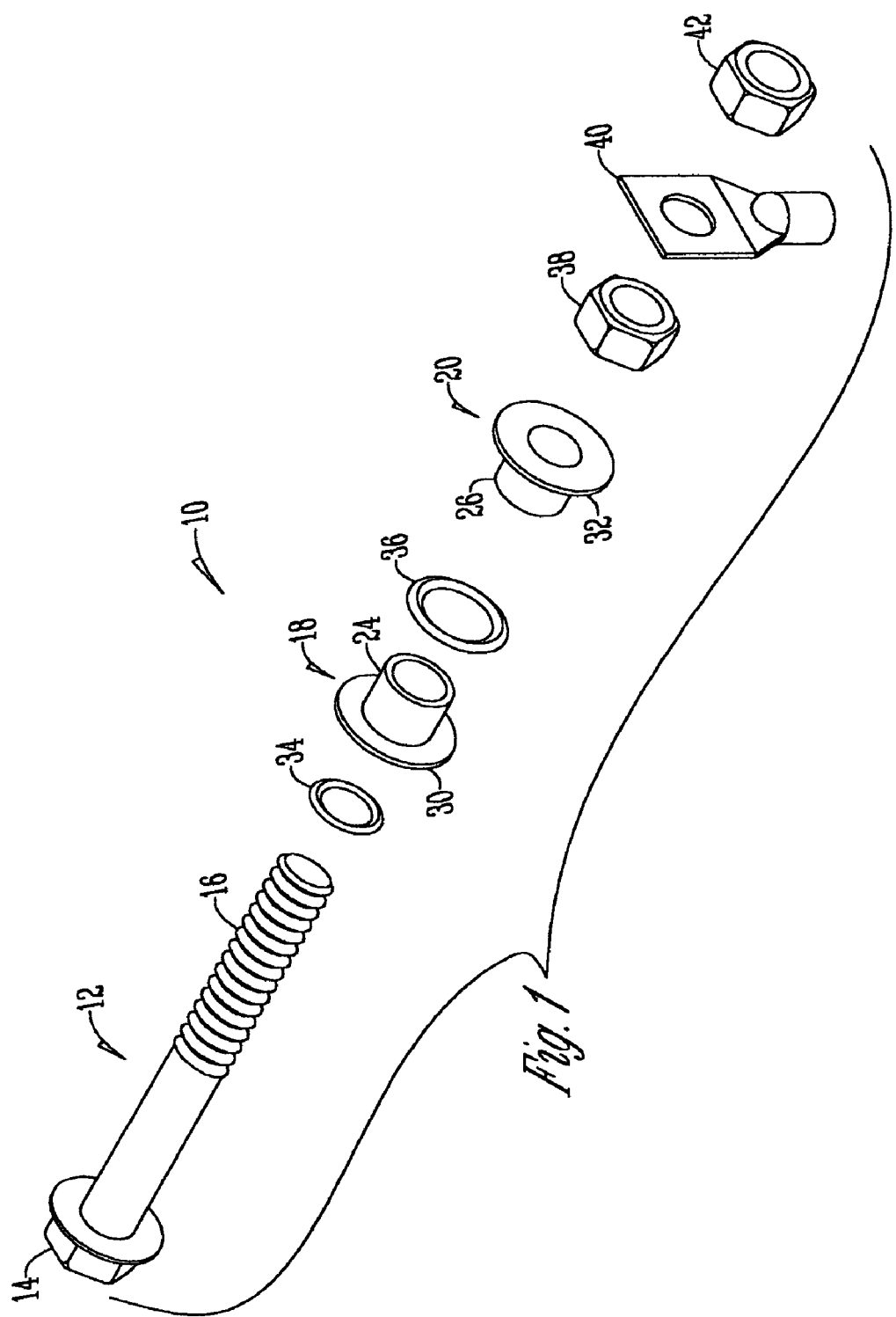
FIG. 1 is an exploded perspective view of an assembled electrical conductor of the present invention.
Figure 2:
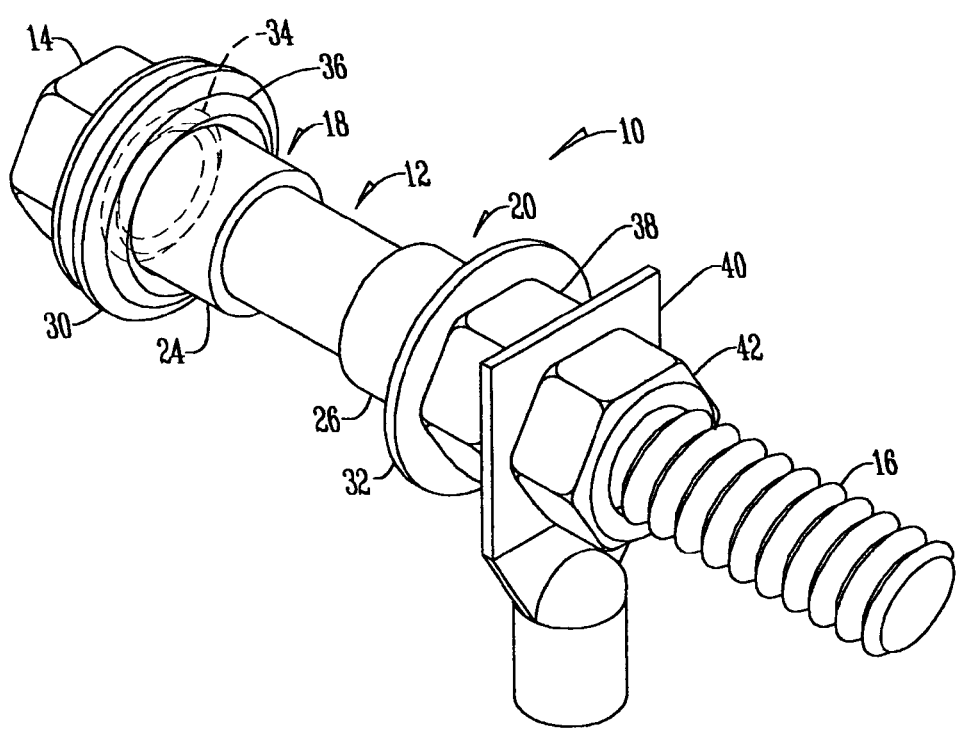
FIG. 2 is a perspective view of an electrical conductor of the present invention.

With reference to the drawings, particularly FIGS. 1 and 2, an electrical conductor 10 is shown which comprises a terminal bolt 12 having a bolt head 14 and a threaded portion 16. Terminal bolt 12 preferably is made of copper or brass to improve electrical conductivity. Terminal bolt 12 is preferably a flange type bolt.

Figure 3:
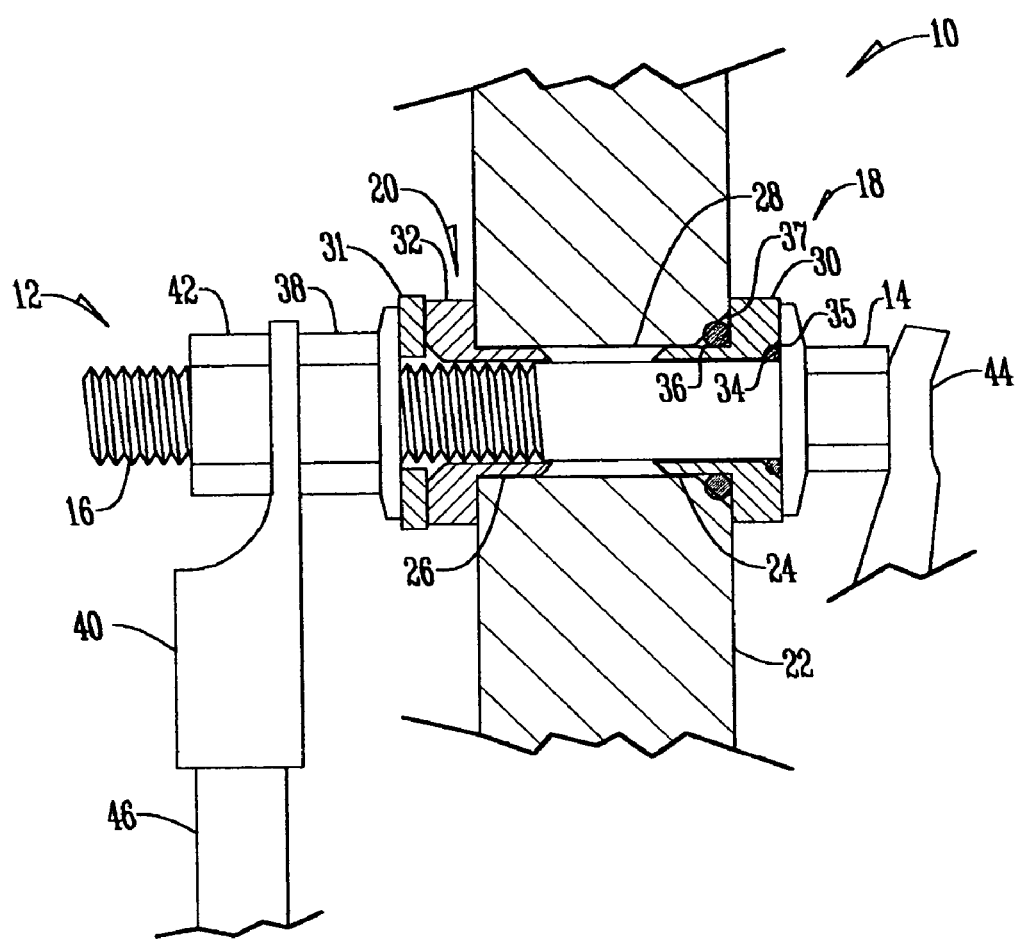
FIG. 3 is a cross-sectional view of an electrical conductor passing through the housing of a fluid filled power unit of the present invention.

Insulating elements 18 and 20 insulate the terminal bolt 12 from the motor housing 22 (FIG. 3). Insulating elements 18 and 20 have substantially cylindrical portions 24 and 26 that are received within the bore 28 of housing 22. Insulating elements 18 and 20 also have flange portions 30 and 32 that engage with housing 22.

Sealing means 34 and 36 are positioned about the terminal bolt 12 and insulating element 18 to form a seal between terminal bolt 12, insulating element 18, and bore 28 in housing 22. Sealing means 34 and 36 are preferably O-rings appropriately sized such that O-ring 34 forms a seal between terminal bolt 12 and insulating element 18 and O-ring 36 forms a seal between insulating element 18 and bore 28. Alternatively, sealing means 34 and 36 may be comprised of resilient washers. Sealing means 34 and 36 are received into optional O-ring groves 35 and 37.

Fastening nut 38 engages with threaded portion 16 of terminal bolt 12 to tighten the electrical conductor 10 about the housing 22 and compress sealing means 34 and 36 to form a seal between terminal bolt 12, insulating element 18, and bore 28. Nut 38 preferably is made of copper or brass to improve the conductivity of the electrical conductor 10.

Wire terminal 40 fits over threaded portion 16 of terminal bolt 12 and engages with Nut 38. Nut 42 is threadably received by terminal bolt 12 to tighten wire terminal 40 firmly against nut 38. Optional washer 31 provides a reduced friction surface while tightening nut 38.

Cables 44 and 46 are attached to the electrical conductor 10 such that electrical current provided by cable 46 passes through the electrical conductor 10 and is received by cable 44. Cable 44 is optionally composed of a plurality of electrical motor stator coil conductors that are collectively attached to terminal bolt 14. Alternatively, cable 44 or the motor coil wires that compose cable 44 are attached to a wire terminal that is further attached to terminal bolt 14. Specifically, cable 44 is attached to the head 14 of terminal bolt 12 by welding, brazing, soldering, or any other conventional method of attachment. Resistance welding of the cable 44 to the terminal may provide improved reliability for many machines. Cable 46 is received by wire terminal 40, which is securely fastened to the electrical conductor 10. Alternatively, terminal 40 and cable 46 are replaced with a conductive metal bar such as a copper bar, an aluminum bar, or a plated copper or aluminum bar.

Figure 4:
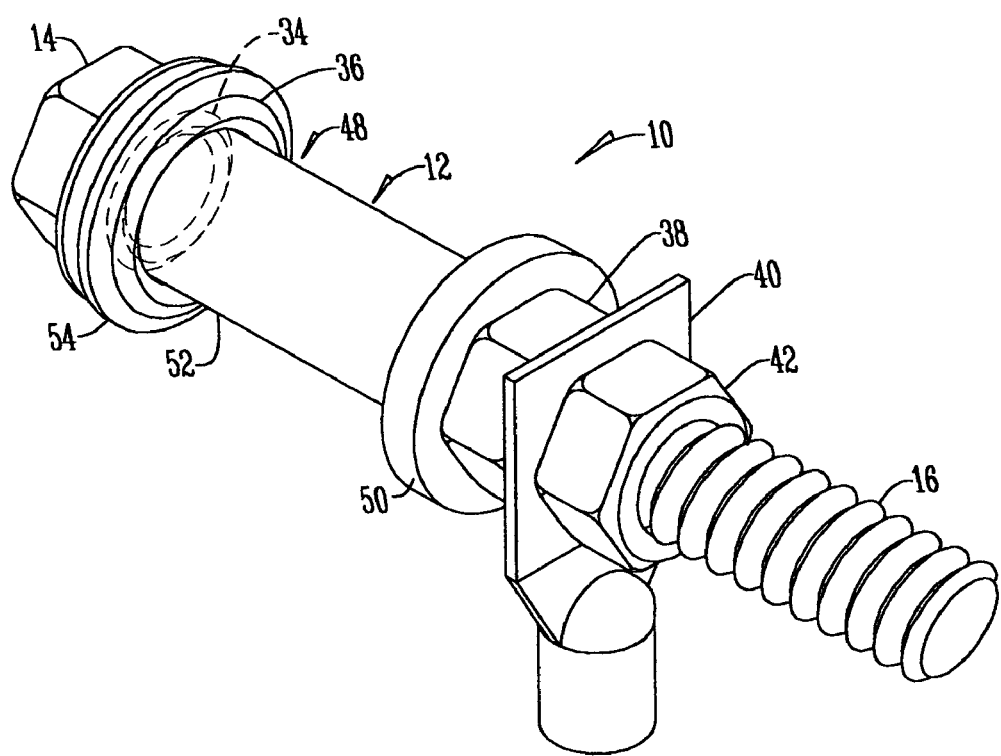
FIG. 4 is an exploded perspective view of an alternative embodiment of the electrical conductor of the present invention.
Figure 5:
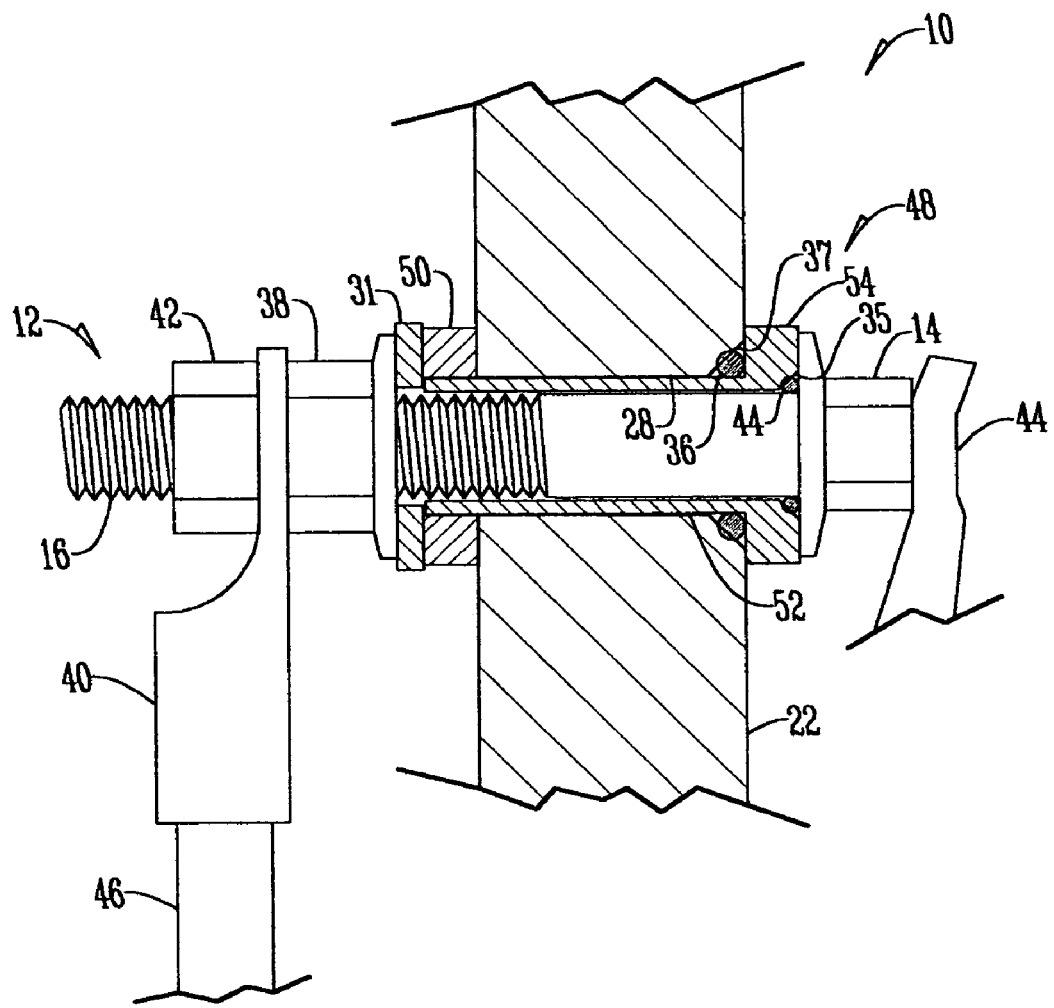
FIG. 5 is a cross-sectional view of an alternative embodiment of the electrical conductor passing through the housing of a fluid filled motor of the present invention.

In an alternative embodiment, the electrical conductor 10 may include insulating elements 48 and 50, as shown in FIGS. 4 and 5. Insulating element 48 is comprised of a substantially cylindrical portion 52 that is received within the bore 28 of housing 22 and extends the entire length of the bore 28 and protrudes slightly from housing 22. Insulating element 48 also has a flange portion 54 that engages with housing 22. Insulating element 50 comprises a non-metallic washer that has an inner diameter greater than the outer diameter of substantially cylindrical portion 52 of the insulating element 48. Insulating element 50 is received by the end of the cylindrical portion 52 of the insulating element 48 and is tightened against housing 22 by fastening nut 38, as best shown in FIG. 5.

Persons skilled in the art will see that while tightening nut 38, it may be desirable to provide a means to prevent bolt 12 from undesired turning. This is accomplished by adding non-circular bores to housing 22 and insulator 18 which prevent the bolt head 14 from turning within the insulator 18 and further prevent the insulator from turning with respect to the housing 22. Alternatively, the end of the threaded portion 16 of bolt 12 is provided with a toolable geometry, such as, for example, a screwdriver slot. As such, a wrench is used to tighten nut 38 while a screwdriver is used to prevent rotation of bolt 12. Alternatively, this toolable geometry may comprise wrench flats or a hex geometry at the threaded end 16 of bolt 12, or a female hex or another female geometry provided within the threaded end 16 of bolt 12.

Sealing means 34 or 36 are optionally molded onto either the terminal bolt 12 or the insulator 18 respectively. Such a method is desirable as the number of loose parts is reduced.

The insulating elements 18, 20, 48, and 50 may comprise a plurality of holes for receiving bolts 12 and a plurality of substantially cylindrical portions 24, 26, and 52. Such a system is desirable because only a single insulating element is required on each side of the housing 22 rather than providing a pair of insulating elements for each electrical conductor assembly 10. Alternatively, insulating elements 18, 20, 54, and 50 may comprise a resilient or elastomeric material. Such insulators are optionally provided with integral sealing means, thereby reducing the number of parts.

In operation, the electrical conductor 10 is used to pass electrical power through a fluid filled power unit housing 22, as shown in FIG. 3. As such, the electrical conductor 10 provides power to electrical components (not shown) within housing 22. Insulating elements 18 and 20 are inserted within the bore 28 of housing 22, and sealing means 36 provides for a leakproof seal between insulating element 18 and bore 28. Terminal bolt 12 passes through insulating elements 18 and 20, and sealing element 34 provides for a leakproof seal between terminal bolt 12 and insulating element 18. Fastening nut 38 is secured to terminal bolt 12 such that the electrical conductor 10 is tightened about the housing 22 to compress sealing means 34 and 36. Nut 42 secures to terminal bolt 12 to tighten wire terminal 40 or a conductive metal bar (not shown) against nut 38. Cables 44 and 46 are attached to the electrical conductor 10 such that power from cable 46 flows through the electrical conductor 10 and is received by cable 44. Accordingly, the electrical conductor 10 transfers power from outside of power unit housing 22 to electrical components (not shown) inside without allowing hydraulic fluid to leak through bore 28.

It is therefore seen that by the use of a sealing means, this invention permits an electrical conductor to pass through the housing of a fluid filled motor without leakage.

What is claimed is:

1. An electrical conductor for a fluid filled power unit comprising:
   a motor housing;
   insulating elements received by a passage extending through the housing;
   a terminal bolt passing through the insulating elements and having a head;
   a first sealing means between the head of the terminal bolt and the insulating elements;
   a second sealing means between the insulating elements and the housing; and
   a fastening nut secured to the terminal bolt compressing the sealing means to seal against fluid flow through the passage.

2. The electrical conductor of claim 1 further comprising a wire terminal secured to the terminal bolt.

3. The electrical conductor of claim 1 wherein an electrical cable is secured to the head of the terminal bolt.

4. The electrical conductor of claim 2 wherein an electrical cable is secured to the wire terminal.

5. The electrical conductor of claim 1 wherein the first sealing means is an O-ring.

6. The electrical conductor of claim 1 wherein the power unit is an electrical machine.

7. The electrical conductor of claim 6 wherein the electrical machine is an electric motor.

8. The electrical conductor of claim 1 further comprising interlocking means to prevent undesired rotation of the terminal bolt.

9. The electrical conductor of claim 1 wherein the insulating elements comprise an elastomeric material.

10. The electrical conductor of claim 9 wherein the insulating elements have O-ring geometries.

* * * * *

UNITED STATES PATENT AND TRADEMARK OFFICE
CERTIFICATE OF CORRECTION

PATENT NO. : 7,038,339 B2  
APPLICATION NO. : 10/815250  
DATED : May 2, 2006  
INVENTOR(S) : Michael D. Gandrud It is certified that error appears in the above-identified patent and that said Letters Patent is hereby corrected as shown below:

Column 4, line 28, delete "motor" and insert --power unit--.

Signed and Sealed this

Fourth Day of July, 2006

JON W. DUDAS  
*Director of the United States Patent and Trademark Office*